United States Patent
Chang

(10) Patent No.: US 7,477,623 B2
(45) Date of Patent: Jan. 13, 2009

(54) METHODS, SYSTEMS, AND COMPUTER PROGRAM PRODUCTS FOR CACHING AND RE-USING BEARER CHANNELS FOR VOICE-OVER-PACKET (VOP) SESSIONS INVOLVING WIRELESS ENTITIES

(75) Inventor: Eric C. Chang, Plano, TX (US)

(73) Assignee: Santera Systems, Inc., Plano, TX (US)

( * ) Notice: Subject to any disclaimer, the term of this patent is extended or adjusted under 35 U.S.C. 154(b) by 583 days.

(21) Appl. No.: 11/055,183

(22) Filed: Feb. 10, 2005

(65) Prior Publication Data

US 2006/0133352 A1 Jun. 22, 2006

Related U.S. Application Data

(60) Provisional application No. 60/637,431, filed on Dec. 17, 2004.

(51) Int. Cl.
*H04Q 7/00* (2006.01)
(52) U.S. Cl. ..................... 370/329; 370/437
(58) Field of Classification Search ............ None
See application file for complete search history.

(56) References Cited

U.S. PATENT DOCUMENTS

| | | | |
|---|---|---|---|
| 6,011,960 A | 1/2000 | Yamada et al. | |
| 6,304,567 B1 | 10/2001 | Rosenberg | |
| 6,308,076 B1 | 10/2001 | Hoirup et al. | |
| 6,408,181 B1 * | 6/2002 | Ho et al. | 455/432.1 |
| 6,721,288 B1 | 4/2004 | King et al. | |
| 7,092,698 B1 * | 8/2006 | Sharp et al. | 455/414.1 |
| 7,110,349 B2 * | 9/2006 | Branlund et al. | 370/203 |

OTHER PUBLICATIONS

Notification of Transmittal of the International Search Report and the Written Opinion of the International Searching Authority, or the Declaration for International Application No. PCT/US05/41930 (Oct. 5, 2007).

* cited by examiner

*Primary Examiner*—Phirin Sam
(74) *Attorney, Agent, or Firm*—Jenkins, Wilson, Taylor & Hunt, P.A.

(57) ABSTRACT

Methods, systems, and computer program products for caching and reusing bearer channels for voice over packet sessions involving wireless entities are disclosed. According to one method, a setup request message is received for a voice over packet session involving a wireless entity. In response to the setup request message, a bearer channel is established using bearer channel setup signaling. When the first session is released, the bearer channel is cached for a predetermined time period. A second setup request message is received. The second setup request message involves the first and second nodes and a wireless entity. In response to the second setup request message, the cached bearer channel is re-used for the second session.

21 Claims, 10 Drawing Sheets

US 7,477,623 B2

METHODS, SYSTEMS, AND COMPUTER PROGRAM PRODUCTS FOR CACHING AND RE-USING BEARER CHANNELS FOR VOICE-OVER-PACKET (VOP) SESSIONS INVOLVING WIRELESS ENTITIES

RELATED APPLICATIONS

This application claims the benefit of U.S. Provisional Patent Application Ser. No. 60/637,431, filed Dec. 17, 2004; the disclosure of which is incorporated herein by reference in its entirety.

TECHNICAL FIELD

The subject matter described herein relates to establishing VoP sessions between network entities for sessions involving wireless entities. More particularly, the subject matter described herein relates to methods, systems, and computer program products for caching and re-using bearer channels for VoP sessions involving wireless entities.

BACKGROUND ART

In Third Generation Partnership Project (3GPP) compliant networks, the Iu interface is the interface between a media gateway (MG) and a radio network controller (RNC). The Nb interface is the interface between MGs. Both the Iu and Nb interfaces are used for bearer channel communications. The protocol used on the Iu interface is referred to as the Iu user plane (Iu-UP) protocol. Similarly, the protocol used on the Nb interface is referred to as the Nb user plane (Nb-UP) protocol. The transport layer for bearer channels set up over the Iu or Nb interfaces can be ATM-based or IP-based. If the transport layer is ATM-based, AAL2 is typically used as the ATM adaptation layer. If the transport layer is IP based, RTP/UDP/IP is typically used.

Before a bearer channel can be established over an Iu or Nb interface, signaling between the RNC and the MG or between MGs must be performed. For AAL2 bearer channels, this signaling is performed according to ITU Recommendation Q.2630. The signaling between RNCs and MGs and between MGs used to establish bearer channels will be referred to herein as bearer channel setup signaling. When an MG receives a session setup request, the MG performs Q.2630 signaling with an adjacent MG or with an RNC to establish a bearer channel for the session. The session is assigned to the bearer channel and the calling and called parties communicate with each other for the duration of the session. When the session is released, the bearer channel is also released. When a new session setup request arrives, the procedure is repeated.

One problem with the above-referenced procedure for establishing sessions between wireless entities is that Q.2630 procedures are resource-intensive. For example, within each media gateway, Q.2630 bearer channel establishment procedures involve the exchange of primitives between media gateway components. This exchange consumes processing resources of the media gateway and the corresponding media gateway controller. In addition, requiring Q.2630 signaling for each new session involving a wireless entity consumes bandwidth on signaling channels between MGs and between MGs and RNCs.

Accordingly, there exists a need for improved methods, systems, and computer program products for assigning bearer channels to voice over packet sessions involving wireless entities.

DISCLOSURE OF THE INVENTION

According to one aspect of the subject matter described herein, a method for caching and re-using bearer channels for voice over packet (VoP) sessions involving wireless entities are disclosed. According to the method, a setup request for a voice over packet session involving a wireless entity is received. In response to the setup request, it is determined whether any cached bearer channels are available for the session. If a cached bearer channel is available, the session is assigned to the cached bearer channel. If a cached bearer channel is not available, a new bearer channel is established using bearer channel setup signaling and the session is assigned to the new bearer channel. Once the session is released, the bearer channel is cached and used for new sessions.

By caching and re-using bearer channels for sessions involving wireless entities, the subject matter described herein reduces the processing load on media gateways and media gateway controllers for VoP sessions. In addition, because bearer channel setup signaling is not required for each new session, bandwidth on signaling channels between MGs and between MGs and RNCs is conserved.

The subject matter described herein for caching and re-using bearer channels may be implemented using a computer readable medium having stored thereon computer executable instructions that when executed by the processor of a computer perform steps. Exemplary computer readable media suitable for implementing the subject matter described herein include chip memory devices, disk memory devices, and application specific integrated circuits.

BRIEF DESCRIPTION OF THE DRAWINGS

Preferred embodiments of the subject matter described herein will now be explained with reference to the accompanying drawings, of which.

DETAILED DESCRIPTION OF THE INVENTION

Figure 1:
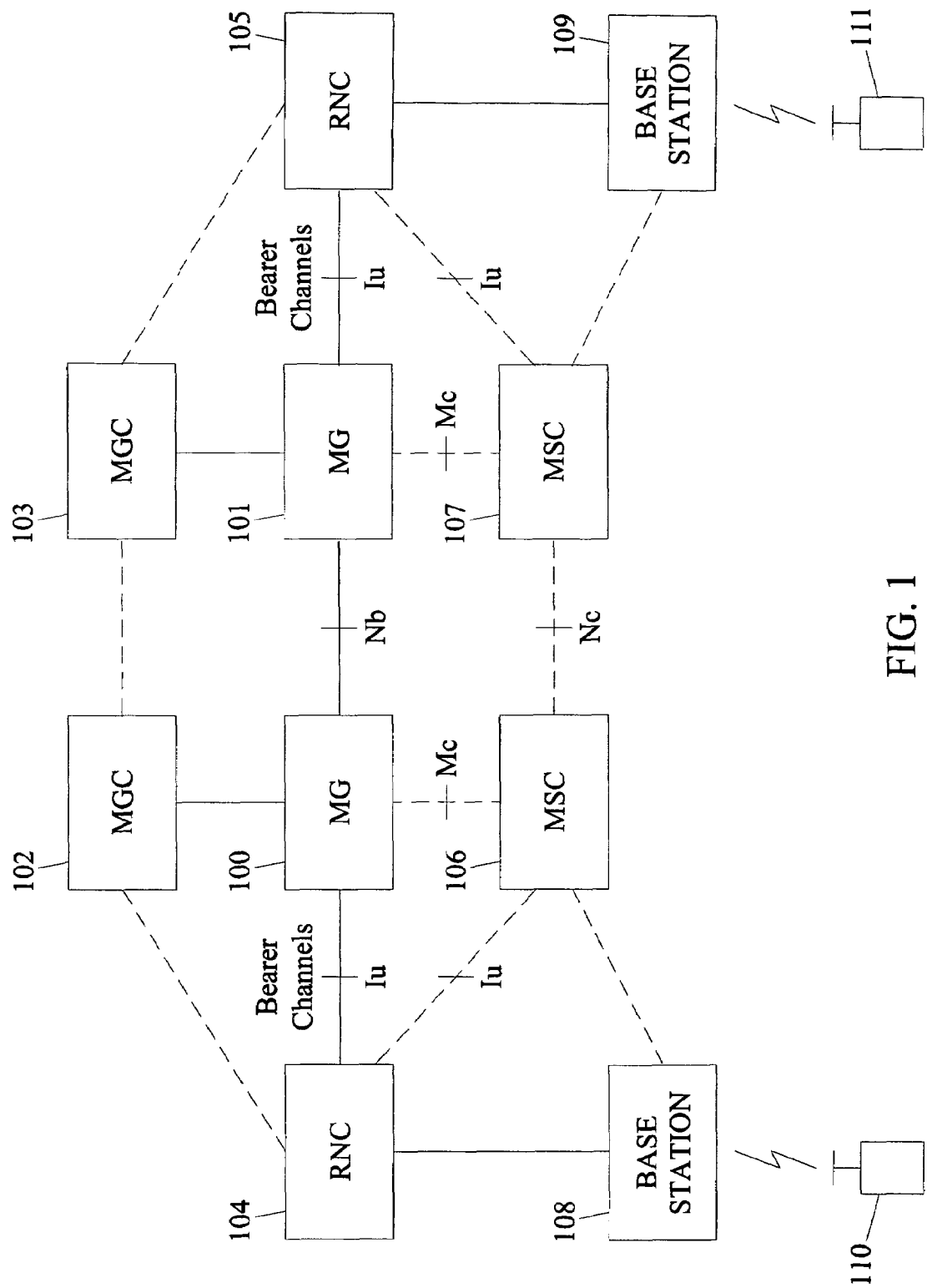
FIG. 1 is a network diagram illustrating exemplary entities involved in establishing communications sessions involving wireless entities.

FIG. 1 is a network diagram illustrating exemplary network entities used to establish sessions involving wireless entities according to an embodiment of the subject matter described herein. In FIG. 1, the network includes MGs 100 and 101, MGCs 102 and 103, RNCs 104 and 105, mobile switching centers (MSCs) 106 and 107, and base stations 108 and 109 for establishing communications between wireless entities 110 and 111, such as mobile handsets. Media gateways 100 and 101 operate under the control of media gateway controllers 102 and 103 to establish bearer channels between each other over the Nb interface and with RNCs 104 and 105 over the Iu interface. Conventionally, such bearer channels have been established using Q.2630 signaling for each new session, and the bearer channels are released when the corresponding session is released. According to an important aspect of the subject matter described herein, MGs 100 and 101 cache and re-use bearer channels on both the Nb and Iu interfaces for sessions involving wireless entities. An exemplary caching and re-use procedure will be described in detail below.

Media gateway controllers 102 and 103 communicate with each other and with external signaling nodes using call setup signaling protocols, such as bearer independent call control (BICC). Media gateway controllers 102 and 103 control their respective media gateways using a media gateway control protocol, such as MGCP or MEGACO.

RNCs 104 and 105 communicate with MGs 100 and 101 to establish bearer channels for media sessions involving wireless entities. As stated above, such bearer channel establishment was typically performed using Q.2630 signaling for each new session. According to the subject matter described herein, Q.2630 procedures are preferably only performed if a cached bearer channel is not available. RNCs 104 and 105 also interface with base stations 108 and 109 to control aspects of radio interface communications between base stations 108 and 109 and wireless entities 110 and 111. For example, RNCs 104 and 105 may monitor radio network interface signal strength and perform handover control when the signal from one base station falls below a threshold and the signal from another base station exceeds a threshold.

MSCs 106 and 107 perform switching and signaling functions for sessions involving wireless entities. For example, for mobile-originating calls, mobile switching centers 106 and 107 may locate the called subscriber and perform the call setup signaling functions necessary to route the call to the called subscriber. For mobile terminating calls, mobile switching centers 106 and 107 may perform call setup signaling necessary to establish the call with a mobile station within the MSC's service area.

Base stations 108 and 109 communicate with wireless entities 110 and 110 over the wireless interface. For example, base stations 108 and 109 may use TDMA, CDMA, FDMA, or other procedure to modulate a carrier signal with data to be transmitted to and from wireless entities 110 and 111.

Figure 2:
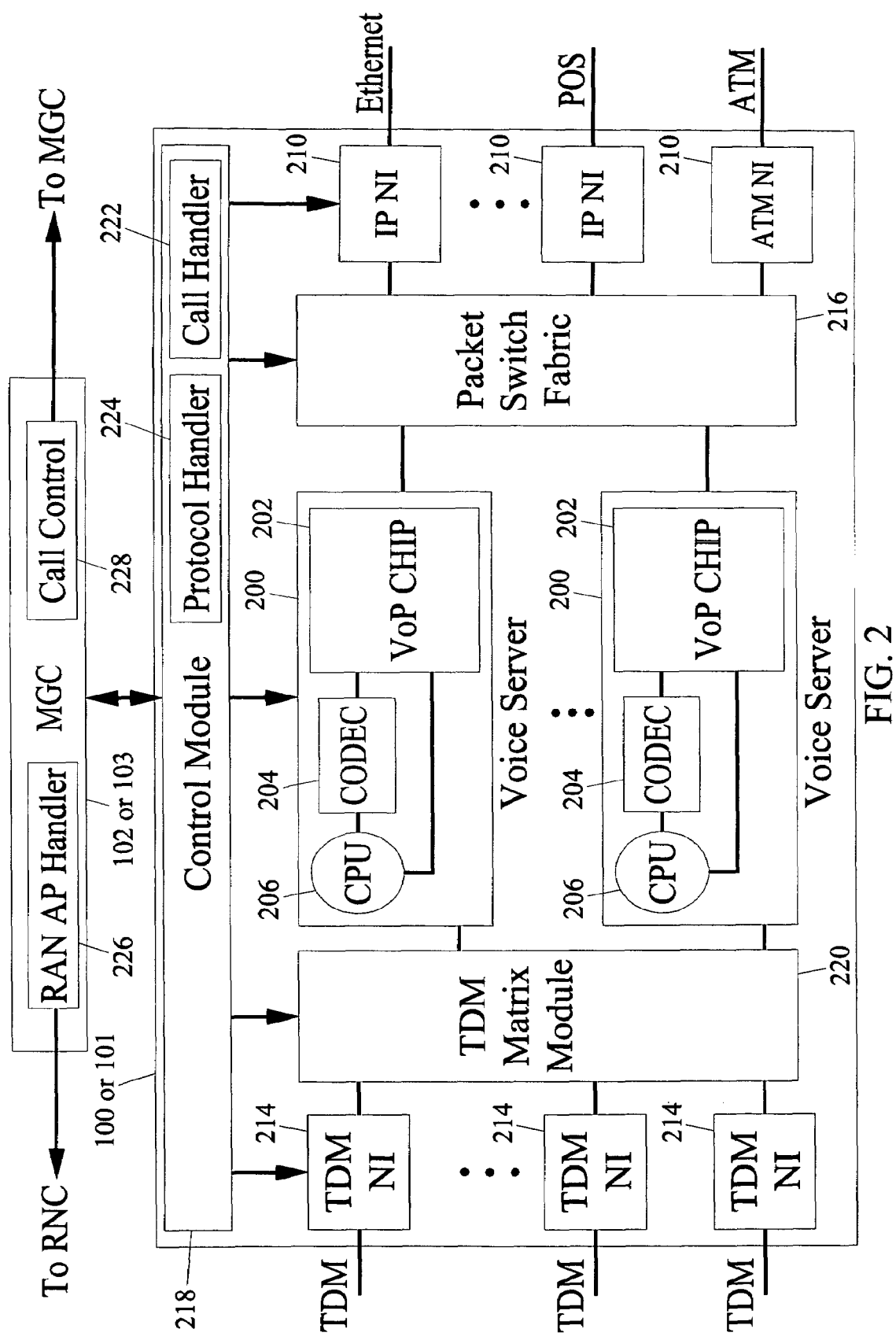
FIG. 2 is a block diagram illustrating an exemplary architecture for a media gateway and a media gateway controller according to an embodiment of the subject matter described herein.

FIG. 2 is a schematic diagram illustrating an exemplary internal architecture for media gateway 100 or 101 in more detail. In FIG. 2, media gateway 100 or 101 includes voice servers 200, which include various voice chips, such as a voice over packet (VoP) chip 202, a codec 204, and a CPU 206. VoP chip 202 may perform voice over packet functions, such as voice over ATM and voice over IP functions. Codec 204 may perform transcoding functions. CPU 206 may control the overall operation of voice server 200.

In addition to a plurality of voice servers 200, media gateway 100 or 101 includes a plurality of network interfaces 210. Each network interface 210 implements network layer functions and packet forwarding functions, such as IP forwarding functions. In the illustrated example, different network interfaces are provided to connect to external Ethernet, Packet-Over-SONET (POS), ATM, and MPLS networks.

In addition to packet-based network interfaces 210, media gateway 100 or 101 may also include TDM network interfaces 214. TDM network interfaces 214 send and receive voice frames from external TDM networks. TDM network interfaces 214 may implement any suitable physical layer protocols for sending and receiving voice frames over TDM links. For example, each TDM network interface 214 may terminate one or more TDM voice trunks.

In order to switch media packets between network interfaces 210 and voice servers 200, media gateway 100 or 101 includes a packet switch fabric 216. Packet switch fabric 216 routes packets between voice servers 200 and network interfaces 210 under the control of control module 218. As discussed above, packet switch fabric 216 may connect every network interface 210 to every voice server 200. In addition to packet switch fabric 216, media gateway 100 or 101 may also include a TDM matrix module 220 for switching traffic that is carried in each TDM timeslot. TDM matrix module 220 is also controlled by control module 218. Control module 218 may communicate with media gateway controller 102 or 103 to dynamically allocate logical and physical resources for each session.

In the illustrated example, control module 218 includes a call handler 222 and a protocol handler 224. Call handler 222 performs the procedures described herein for establishing, caching, and re-using bearer channels for new sessions. Call handler 222 also communicates with MGC 102 or 103 using one of the above-referenced media gateway control protocols. Protocol handler 222 implements Q.2630, MTP3B and ATM protocols for establishing bearer channels with RNCs and adjacent MGs when a cached bearer channel is not available.

Media gateway controller 102 or 103 includes a radio access network application part (RANAP) handler 226 for communicating with an RNC via the RANAP protocol and a call control module 228 for communicating with external entities using call control protocols, such as BICC, and for communicating with media gateway 101 or 103 using one of the above-referenced media gateway control protocols.

Figure 3:
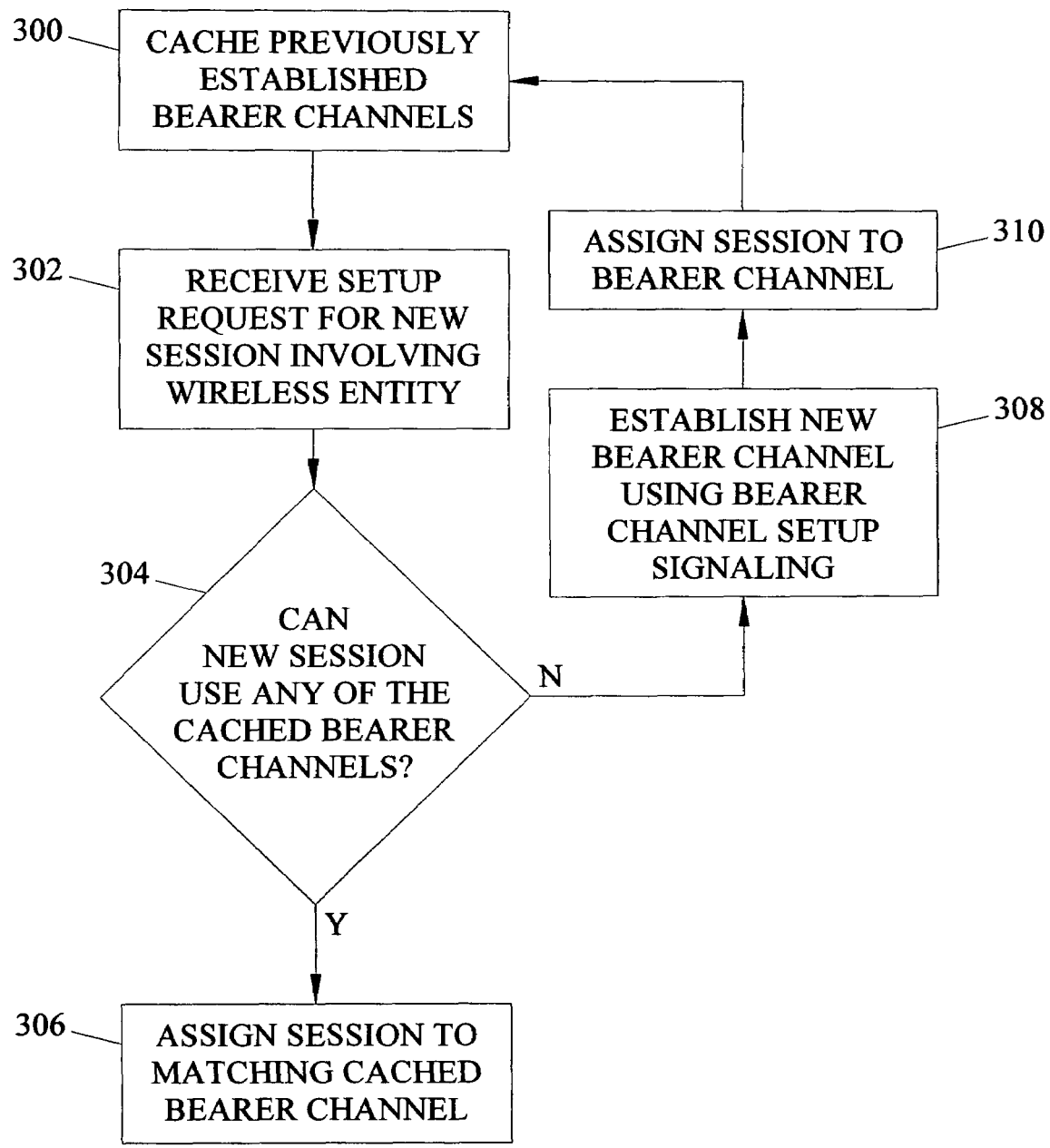
FIG. 3 is a flow chart illustrating exemplary steps for caching and re-using bearer channels for sessions involving wireless entities according to an embodiment of the subject matter described herein.

FIG. 3 is a flow chart illustrating exemplary steps that may be performed by call handler 222 in caching and re-using bearer channels for sessions involving wireless entities according to an embodiment of the subject matter described herein. Referring to FIG. 3, in step 300, call handler 222 caches previously established bearer channels for which sessions have been released. Caching such bearer channels includes maintaining a bearer channel identifier for the bearer channel in memory accessible by call handler 222 and maintaining resources associated with bearer channel, such as the voice server associated with the bearer channel. In step 302, call handler 222 receives a request for a new call/session. The request may be generated by media gateway controller 102 or 103 in response to a setup message associated with a new session. The call setup message may be an ISUP IAM message, a PRI SETUP message, a SIP INVITE message, or any other suitable type of call setup message for initiating a call. In step 304, call handler 222 determines whether the session can be assigned to a cached bearer channel. The determination may be based on whether the session involves endpoints used by any of the cached bearer channels. For example, the endpoints may be a pair of media gateways or a media gateway and an RNC. If the session can be assigned to any of the cached bearer channels, control proceeds to step 306 where call handler 222 assigns the session to the cached bearer channel. Assigning the session to a cached bearer channel may include assigning the voice server 200 and the voice chip for the bearer channel to the session. This step may be accomplished by adding an entry for the session in session tables maintained by network interfaces 210 so that network interfaces 210 can identify the session and forward packets associated with the session to the appropriate voice server 200. In addition, call handler 222 may communicate the bearer channel identifier to the remote end of the session so that the remote end of the session can use the same previously established bearer channel for the session.

Returning to step 304, if the endpoints for the new session do not match any of the cached bearer channels, control proceeds to step 308 where call handler 222 establishes a new bearer channel for the session using bearer channel setup signaling, such as Q.2630 signaling. Once the bearer channel has been established, control proceeds to step 310 where the session is assigned to the bearer channel.

Once a bearer channel has been assigned to the session, media gateway 200 classifies packets having the same session identifier to the session. That is, packets are forwarded via the switch fabric 206 to and from the voice chip assigned to the session for voice processing. Exemplary operations that may be performed by the assigned voice chip may include segmentation and reassembly (SAR), echo cancellation, transcoding, DTMF detection, DTMF generation, announcement, conference bridging, Internet Fax, and law enforcement. Once the voice packets associated with the session have been processed, the voice packets may be sent from the voice chip to one of the packet network interface cards 210 or to a TDM network interface card 214 for transmission to the remote end of a session. Once a session ends, call handler 222 caches the bearer channel for a predetermined time period so that the bearer channel can be reused. The time period may be configurable by the operator.

Figure 4:
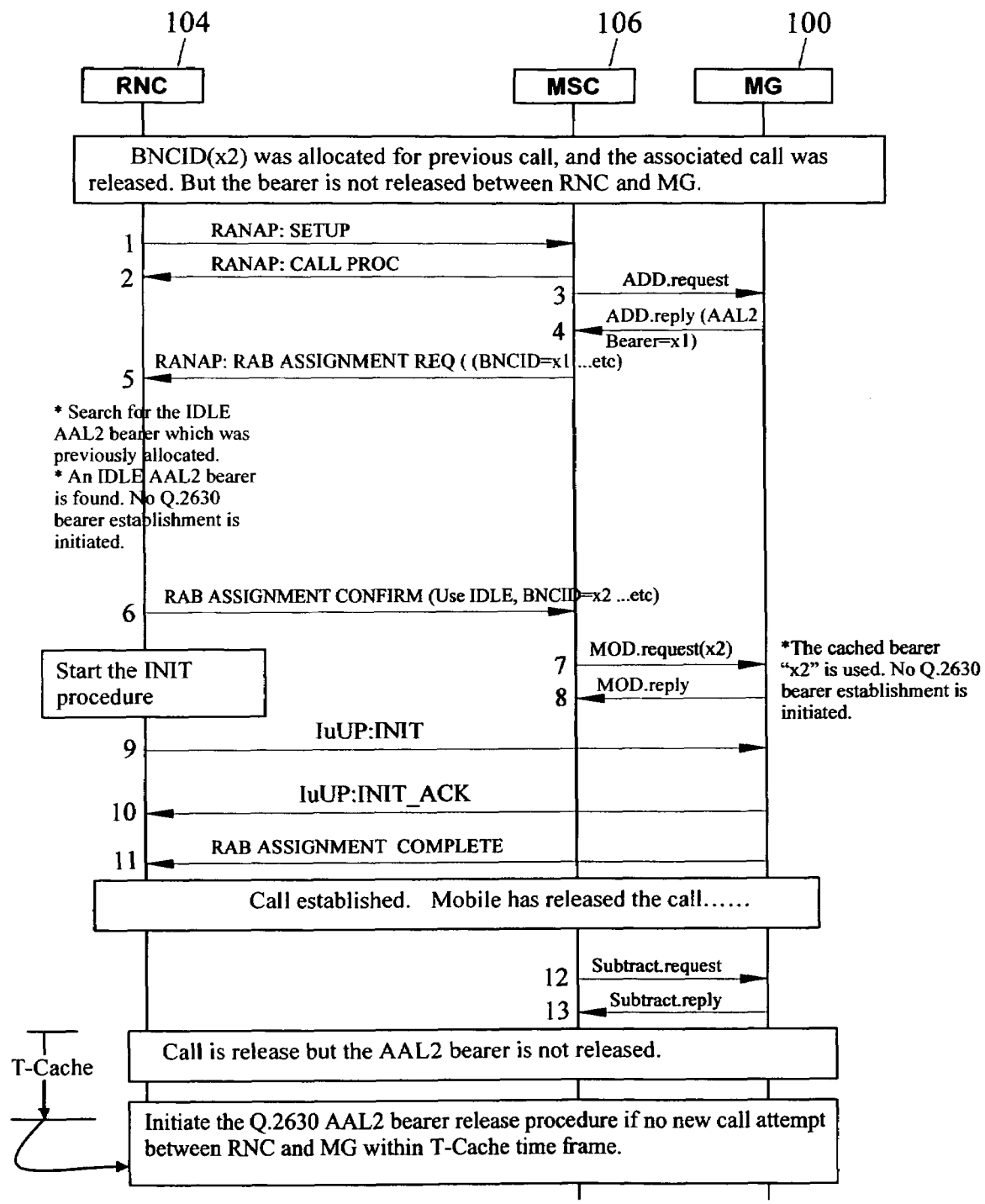
FIG. 4 is a message flow diagram illustrating exemplary messages exchanged in caching and re-using an AAL2 bearer channel between an RNC and an MG according to an embodiment of the subject matter described herein.

FIG. 4 is a message flow diagram illustrating exemplary messages that may be exchanged between network entities in re-using a cached AAL2 bearer channel on the Iu interface. In the message flow diagram, it is assumed that a bearer channel having the bearer channel ID x1 has been established between MG 102 and RNC 104, the corresponding session has been released, and that call handler 222 of media gateway 100 and a corresponding call handler associated with RNC 104 have cached the bearer channel. In line 1 of the message flow diagram, in response to a mobile-originated call, RNC 104 sends a RANAP setup message to MSC 106 to establish the bearer channel. In response to the setup message, in line 2 of the message flow diagram, MSC 106 sends a RANAP call proceeding message to RNC 104. In line 3 of the message flow diagram, MSC 106 sends an add request message to MG 102 requesting that MG 102 add a new bearer channel on the Iu interface. Rather than performing Q.2630 signaling to add the new channel, MG 102 determines that the cached bearer channel x1 can be used for the session. Accordingly, in line 4 of the message flow diagram, MG 102 sends and add reply message to MSC 106 with the bearer channel ID x1. In line 5 of the message flow diagram, MSC 106 sends a RANAP RAB assignment request message with the bearer channel ID x1 to RNC 104.

After line 5 of the message flow diagram, RNC 104 searches for the idle AAL2 bearer channel which was previously allocated. The search may be performed by looking up the bearer channel ID received in the RAB assignment request message. In this case, an idle AAL2 bearer channel is found and no Q.2630 bearer establishment is initiated. In line 6 of the message flow diagram, RNC 104 sends a RAB assignment confirm message to MSC 106 confirming assignment of the session to the bearer channel.

In line 7 of the message flow diagram, MSC 106 sends a modify request message to media gateway 100 to use the bearer channel. In line 8 of the message flow diagram, media gateway 100 sends a modify reply message to MSC 106.

In line 9 of the message flow diagram, RNC 104 sends an IuUP initialization message to media gateway 100. In line 10 of the message flow diagram, media gateway 100 sends an initialization acknowledgement message. In line 11 of the message flow diagram, media gateway 100 sends a RAB assignment complete message to RNC 104.

After line 11 of the message flow diagram, the session is established and the cached to bearer channel is used for the session. Once the called or calling party releases the session, in line 12 of the message flow diagram, MSC 106 sends a subtract request message to a media gateway 100. In line 13 of the message flow diagram, media gateway 100 sends a subtract reply message to MSC 106. The subtract request and subtract reply messages release the session, but not the bearer channel. The bearer channel is preferably cached for a predetermined time period referred to as T-cache in FIG. 4. If no new session attempts occur between the RNC and the MG within the T-cache timeframe, the bearer channel may be released using the Q.2630 bearer channel release procedure.

Figure 5:
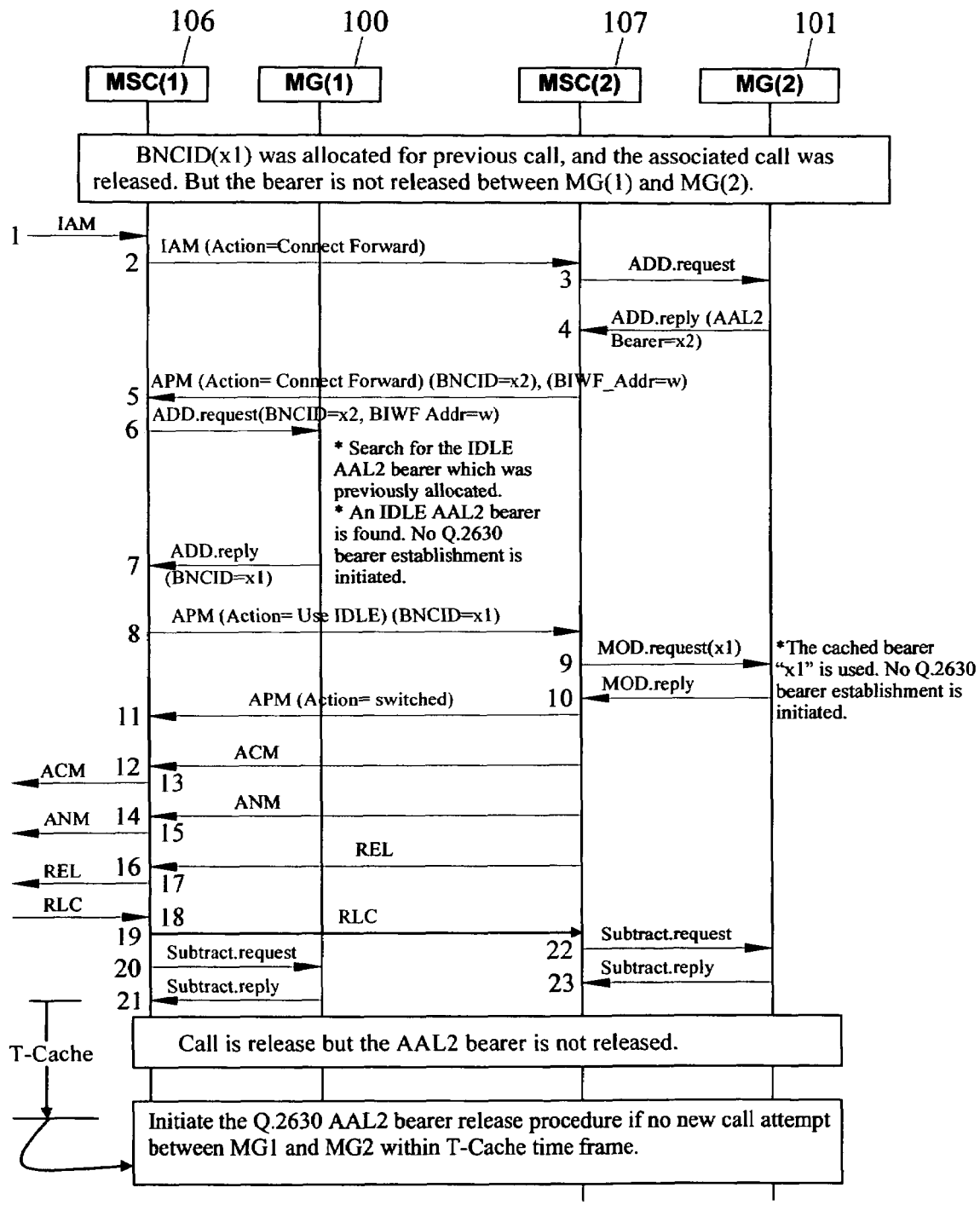
FIG. 5 is a message flow diagram illustrating exemplary messages exchanged between media gateways in caching and re-using an AAL2 bearer channel between MGs for a session established in the forward direction according to an embodiment of the subject matter described herein.

In addition to caching bearer and re-using bearer channels on the Iu interface, the subject matter described herein also includes methods, systems, and computer program products for caching and re-using bearer channels on the Nb interface. FIG. 5 is a message flow diagram illustrating exemplary messages exchanged in caching and re-using a bearer channel on the Nb interface. In FIG. 5, it is assumed that a bearer channel having the bearer channel identifier x1 has been allocated, the corresponding session has been released, and media gateways 101 and 102 have cached the bearer channel.

Referring to FIG. 5, in line 1, MSC 106 receives an initial address message (IAM) for establishment of a new session. In line 2 of the message flow diagram, MSC 106 sends an IAM message with a connect forward parameter to terminating MSC 107. The connect forward parameter indicates that setup of the bearer channel will be originated by originating MSC 106. In line 3 of the message flow diagram, MSC 107 sends an add request message to media gateway 101 requesting allocation of a bearer channel. In line 4 of the message flow diagram, media gateway 101 sends an add reply message to MSC 107 indicating that a new bearer channel x2 will be used for the session. In line 5 of the message flow diagram, MSC 107 sends an application transport (APM) message to originating MSC 106 including the bearer channel ID x2. In line 6 of the message flow diagram, MSC 106 sends an add request message to media gateway 100 requesting that bearer channel x2 be established. In response to the add request message, rather than using Q.2630 bearer channel signaling, media gateway 100 searches for an idle bearer channel and locates the bearer channel x1. Accordingly, the bearer channel x1 is used by media gateway 100 for the session. No Q.2630 bearer channel establishment is requested.

In line 7 of the message flow diagram, media gateway 100 sends an add reply message to MSC 106 requesting that bearer channel x1 be added. In line 8 of the message flow diagram, MSC 106 sends an APM message to MSC 107 requesting that MSC 107 use bearer channel ID x1. In line 9 of the message flow diagram, MSC 107 sends a modify request message to media gateway 101 including the bearer channel ID x1. Media gateway 101 uses the bearer channel x1 and no Q.2630 bearer channel establishment is initiated. In line 10 of the message flow diagram, media gateway 101 sends a modify reply message to MSC 107 confirming that the bearer channel has been established. In lines 11-15 of the message flow diagram, MSC 106 and MSC 107 exchange ISUP messages used to establish the session. MSC 106 forwards the ISUP messages to the switching office that originated the session. In lines 16-19 of the message flow diagram, MSCs 106 and 107 exchange ISUP messages used to release the session. However, the corresponding bearer channel is not released. For example, in lines 20-23 of the message flow diagram, the originating and terminating MSCs send exchange subtract messages with the corresponding media gateways to release the session, but not the bearer channel. After the session is released, the bearer channel between media gateways 101 and 102 is cached for a predetermined time period. If a new session attempt does not occur within the time period, the bearer channel is released to free resources used by the bearer channel.

Figure 6:
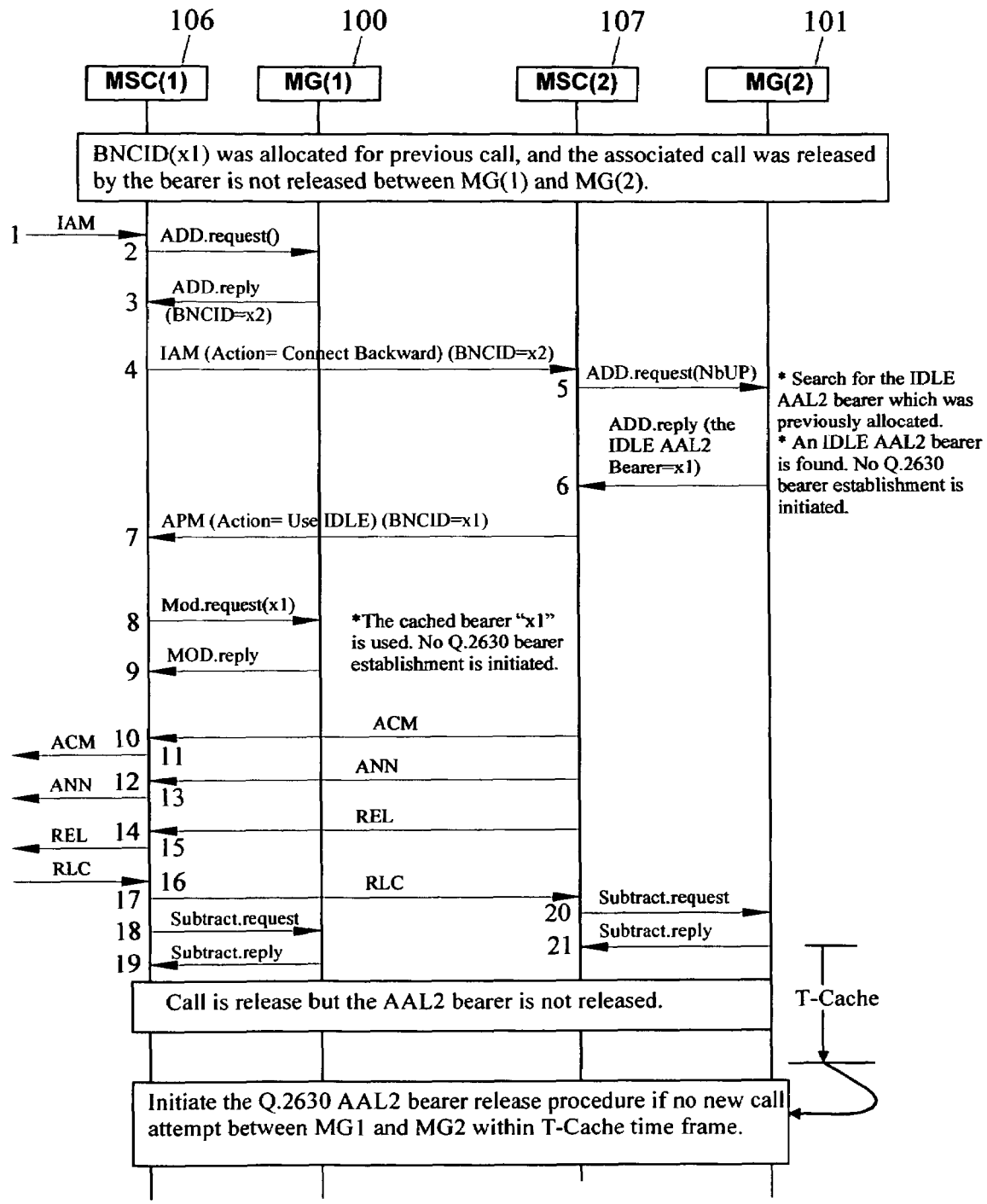
FIG. 6 is a message flow diagram illustrating exemplary messages between MGs in caching and re-using an AAL2 bearer channel for a session established in the reverse direction according to an embodiment of the subject matter described herein.

FIG. 6 is a message flow diagram illustrating exemplary steps for caching and reusing an AAL2 bearer channel on the Nb interface where the bearer channel is established in the reverse direction. In the reverse direction, the terminating media gateway 101 initiates establishment of the bearer channel with originating media gateway 100. Other than the direction of the bearer channel establishment, the messages in FIG. 6 are the same as those in FIG. 5. Hence, a description thereof will not be repeated herein.

Figure 7:
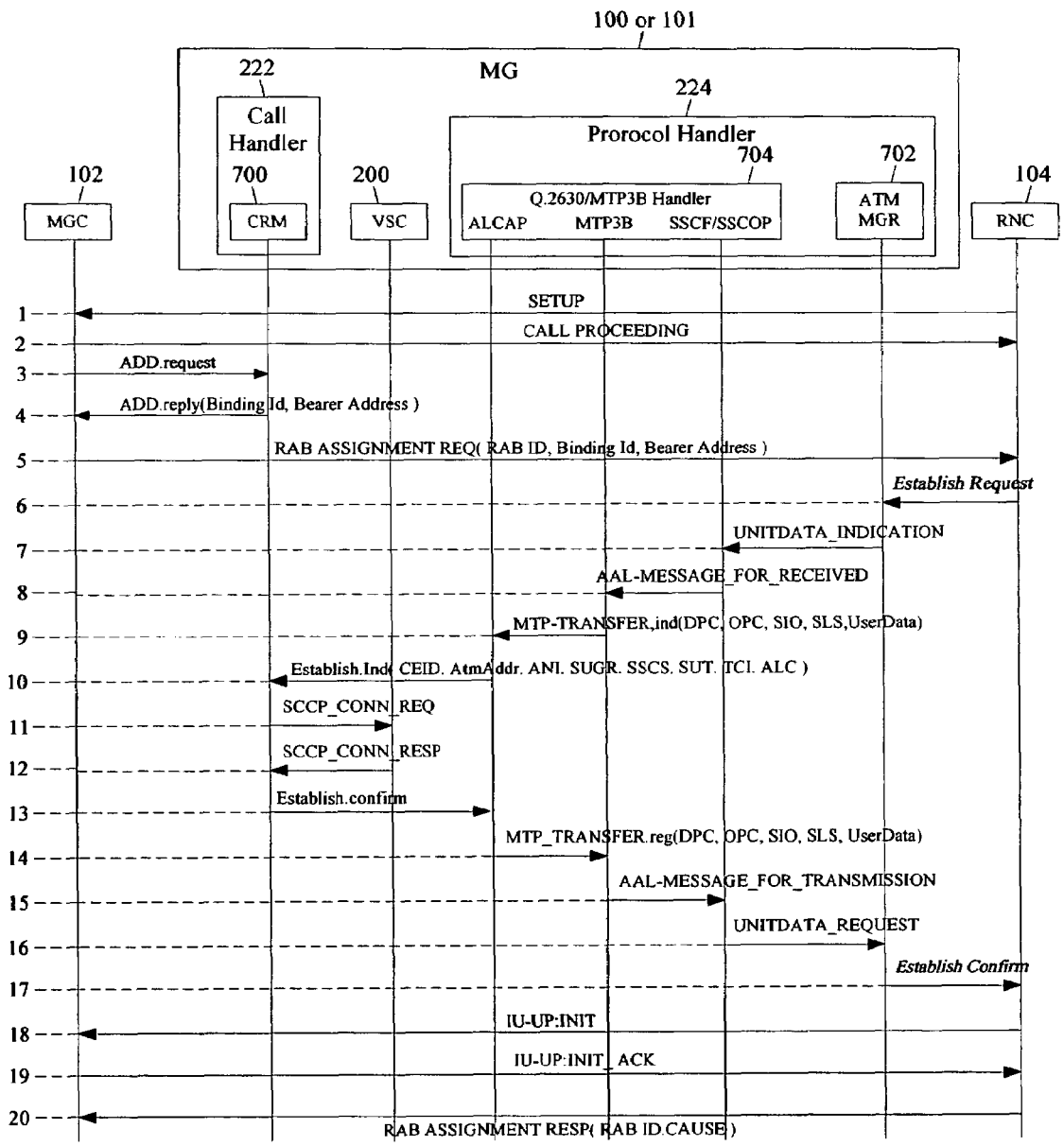
FIG. 7 is a message flow diagram illustrating exemplary messages exchanged between entities within an MG in establishing an AAL2 bearer channel with an RNC using Q.2630 signaling.

As stated above, when a cached bearer channel is not available, Q.2630 signaling may be used to establish a bearer channel. FIG. 7 is a message flow diagram illustrating exemplary messages that may be exchanged in establishing a bearer channel between media gateway 100 and RNC 104 on the Iu interface. Referring to FIG. 7, in line 1 of the message flow diagram, RNC 104 sends a setup message to media gateway controller 102 requesting setup of a new session. In line 2 of the message flow diagram, media gateway controller 102 sends a call proceeding message to RNC 104. In line 3 of the message flow diagram, media gateway controller 102 sends an add request message to a component of call handler 222 of media gateway 100 referred to herein as the connection resource manager (CRM) 700. CRM 700 responds to the add request message with an add reply message including the bearer channel identifier and address. In this example, it is assumed that the bearer channel is a new bearer channel that has not been previously established. In line 5 of the message flow diagram, media gateway controller 102 sends a RAB assignment message including the bearer channel identifier and address to RNC 104.

In line 6 of the message flow diagram, RNC 104 sends a Q.2630 establish request message to a component of protocol handler 224 referred to as the ATM manager 702. ATM manager 702 performs functions required to set up the ATM portion of the bearer channel. A second component of protocol handler, referred to as Q.2630/MTP3B handler 704, handles Q.2630 and MTP3B portions of the bearer channel. In line 7 of the message flow diagram, ATM manager 702 sends a unitdata indication to Q.2360/MTP3B portion 704. In line 8 of the message flow diagram, Q.2630/MTP3B handler 704 sends an AAL message_for_received to its MTP3B component. In line 9 of the message flow diagram, the MTP3B component of Q.2630/MTP3B handler 704 sends an MTP transfer indication message to its access link control application part (ALCAP) component, which implements a UMTS access link control signaling protocol.

In line 10 of the message flow diagram, the ALCAP component sends an establish indication message to connection resource manager 700 of call handler 222. In line 11 of the message flow diagram, connection resource manager 700 sends an SCCP connection request message to a voice server card (VSC) 200.

In line 12 of the message flow diagram, VSC 200 sends an SCCP connection response to CRM 700. In line 13 of the message flow diagram, CRM 700 sends an establish confirm message to the ALCAP component of protocol handler 224.

In line 14 of the message flow diagram, the ALCAP component sends an MTP transfer message to MTP3B component of Q.2630/MTP3B handler 704. In line 15 of the message flow diagram, the MTP3B component of Q.2630/MTP3B handler sends an AAL message_for_transmission message to SSCF/SSCOP component of Q.2630/MTP3B handler 704. In line 16 of the message flow diagram, the SSCF/SSCOP component of Q.2630/MTP3B handler 704 sends a unitdata request message to ATM manager 702. In line 17 of the message flow diagram, ATM manager 702 sends a Q.2630 establish confirm message to RNC 104 confirming establishment of the bearer channel. In line 18 of the message flow diagram, RNC 104 sends an Iu-UP initialization message to MGC 102. In line 19 of the message flow diagram, MGC 102 sends an Iu-UP initialization acknowledgement message to RNC 104. In line 20 of the message flow diagram, RNC 104 sends a RAB assignment message confirming establishment of the bearer channel.

In FIG. 7, each message from lines 6-17 of the message flow diagram is part of the Q.2630 procedure for bearer channel establishment. The relevant industry standards, such as 3GPP TS 23.205, specify that such procedures are required for sessions involving wireless entities. However, as described above, rather than performing these detailed procedures for each new session, the methods, systems, and computer program products described herein cache bearer channels and reuse cached bearer channels for sessions involving wireless entities. Accordingly, the subject matter described herein is an advancement over prior implementations and standards documents relating to sessions involving wireless entities.

Figure 8:
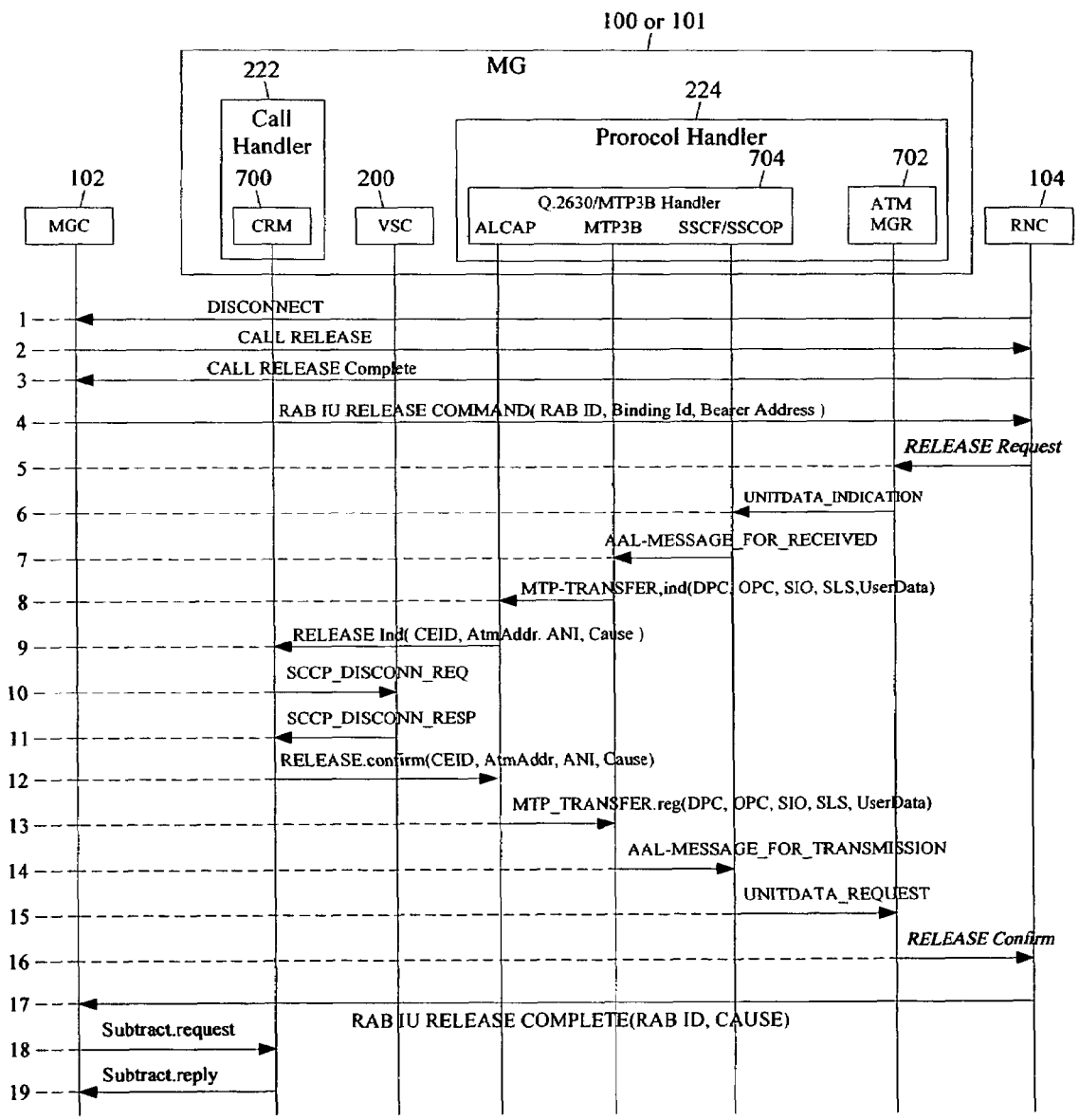
FIG. 8 is a message flow diagram illustrating exemplary messages exchanged between entities within an MG in releasing an AAL2 bearer channel with an RNC using Q.2630 signaling.

FIG. 8 is a message flow diagram illustrating exemplary steps for releasing an AAL2 bearer channel on the Iu interface between RNC 104 and media gateway 100 on the Iu interface. Referring to FIG. 8, in line 1 of the message flow diagram, RNC 104 sends a disconnect message to MGC 102. In line 2 of the message flow diagram, MGC 102 sends a release message requesting release of the session. In line 3 of the message flow diagram, RNC 104 sends a message to MGC 102 indicating that release of the session has been completed. In line 4 of the message flow diagram, MGC 102 sends a RAB Iu release command to RNC 104 requesting release of the corresponding bearer channel.

In line 5 of the message flow diagram, RNC 104 sends a Q.2630 release request message to ATM manager 702 of protocol handler 224. In line 6 of the message flow diagram, ATM manager 702 sends a unitdata indication message to the SSCF/SSCOP component of Q.2630/MTP3B handler 704. In line 7 of the message flow diagram, the SSCF/SSCOP component sends an AAL message_for_received message to the MTP3B component. In line 8 of the message flow diagram, the MTP3B component sends an MTP transfer indication message to the ALCAP component. In line 9 of the message flow diagram, the ALCAP component sends a release indication message to CRM component 700 of call handler 222.

In line 10 of the message flow diagram, CRM component 700 sends an SCCP disconnection request to VSC 200. In line 11 of the message flow diagram, VSC 200 sends an SCCP disconnection response message to CRM component 700. In line 12 of the message flow diagram, CRM component 700 sends a release confirmation message to the ALCAP component of Q.2630/MTP3B handler 704. In line 13 of the message flow diagram, the ALCAP component sends an MTP transfer registration message to the MTP3B component. In line 14 of the message flow diagram, the MTP3B component sends an AAL message_for_transmission message to the SSCF/SSCOP component. In line 15 of the message flow diagram, the SCCF/SSCOP component sends a unitdata request message to ATM manager 702. In line 16 of the message flow diagram, ATM manager 702 sends a release confirmation message to RNC 104.

In line 17 of the message flow diagram, RNC 104 sends a RAB Iu release complete message to MGC 102 indicating that the Iu bearer channel has been released. In lines 18 and 19 of the message flow diagram, MGC 102 and CRM 222 exchange subtract request and reply messages.

In FIG. 8, lines 5-16 represent Q.2630 procedures required to release a bearer channel. Performing such procedures every time a bearer channel between a media gateway and a RNC is released is burdensome on media gateway and RNC resources. According to the methods, systems, and computer program products described herein, such a release procedure is preferably only performed after the caching period for a bearer channel ends. As a result, the methods, systems, and computer program products described herein conserve media gateway resources. In addition, signaling traffic between the RNC and the media gateway is reduced.

Figure 9A:
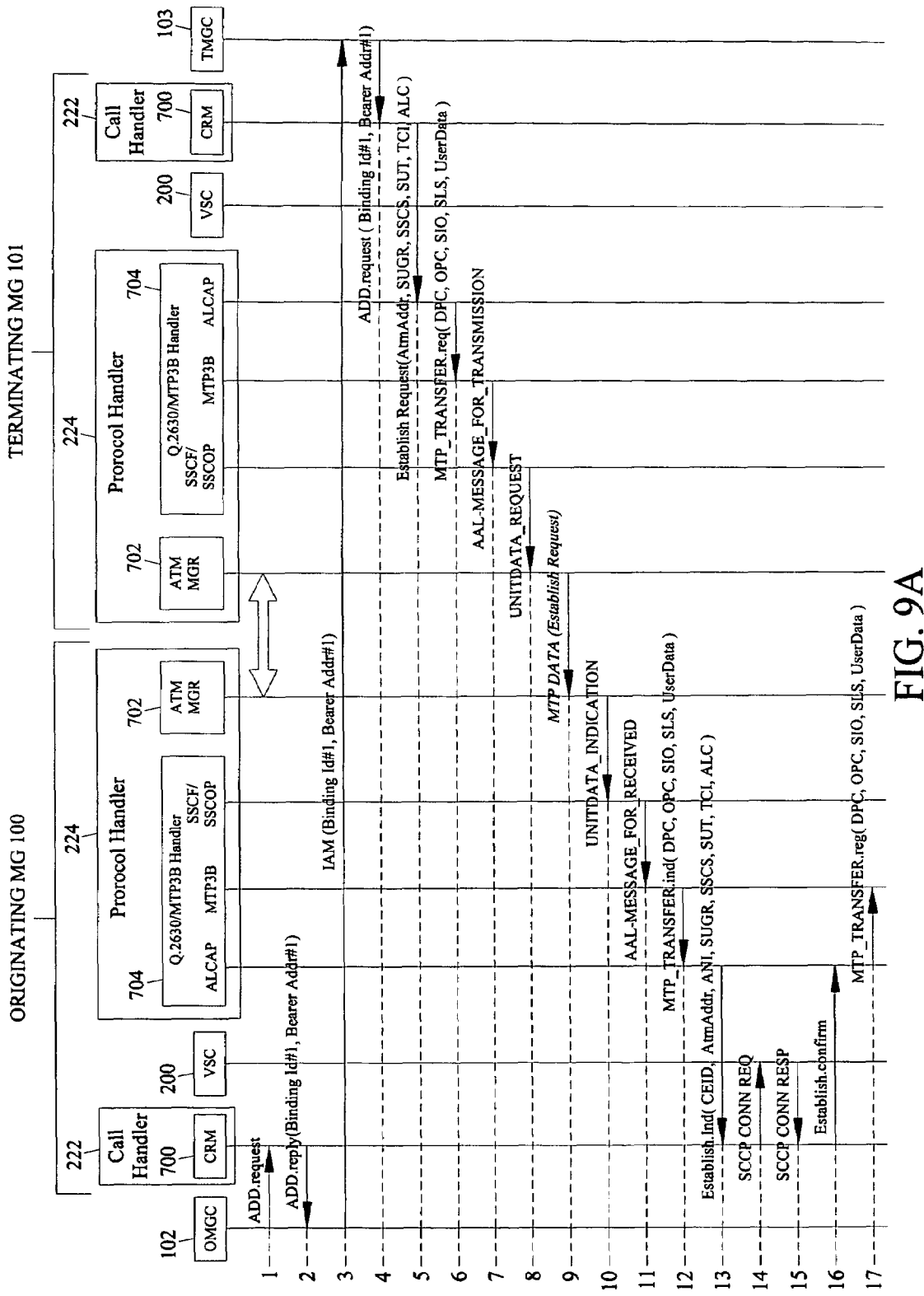
FIGS. 9A and 9B are a message flow diagram illustrating exemplary messages exchanged between entities within originating and terminating MGs in establishing an AAL2 bearer channel between the media gateways using Q.2630 signaling.
Figure 9B:
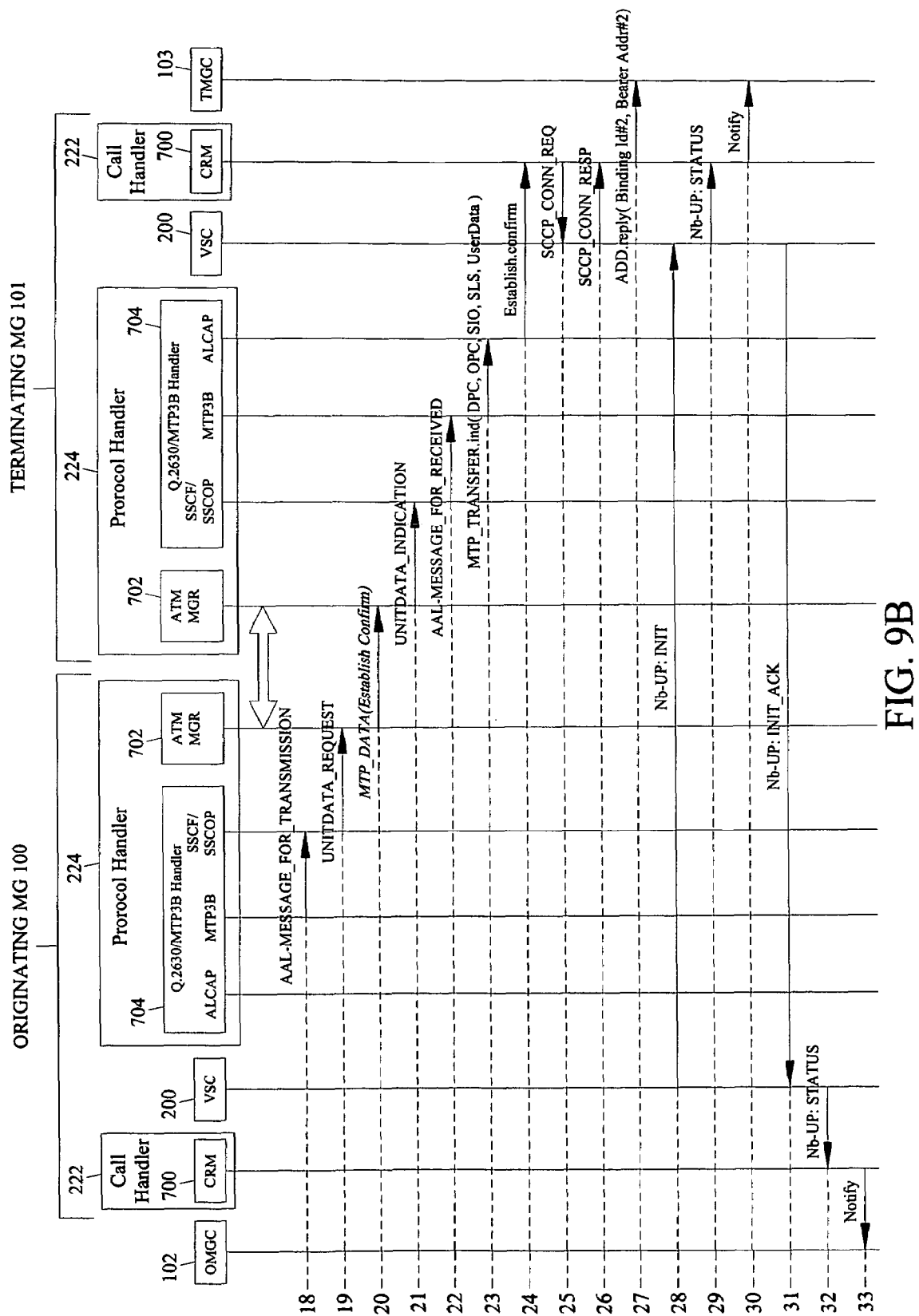

Q.2630 procedures are also performed on the Nb interface between media gateways to establish and release bearer channels on media gateway when a cached bearer channel cannot be used. FIGS. 9A and 9B are a message flow diagram illustrating exemplary steps performed in establishing a bearer channel on the Nb interface between originating and terminating media gateways. Referring to FIG. 9 in line 1 of the message flow diagram, originating media gateway controller 102 sends an add request message to CRM component 700 of originating media gateway 100. In line 2 of the message flow diagram, CRM component 700 sends an add reply message to media gateway controller 102. In line 3 of the message flow diagram, originating media gateway controller 102 sends an IAM message to terminating media gateway controller 103. In line 4 of the message flow diagram, terminating media gateway controller 103 sends an add request message to CRM component 700 of terminating media gateway 101. In line 5 of the message flow diagram, CRM component 700 of terminating media gateway 100 sends an established request message to the ALCAP component of terminating media gateway 101. In line 6 of the message flow diagram, the ALCAP component of terminating media gateway 101 sends an MTP transfer request message to the MTP3B component of terminating media gateway 101. In line 7 of the message flow diagram, the MTP3B component of terminating media gateway 101 sends an AAL message_for_transmission to the SSCF/SSCOP component. In line 8 of the message flow diagram, the SSCF/SSCOP component sends a unitdata request message to the ATM manager. In line 9 of the message flow diagram, ATM manager 702 of terminating media gateway 101 sends an MTP data establish request message to ATM manager 702 of originating media gateway 100.

In line 10 of the message flow diagram, ATM manager 702 of originating media gateway 100 sends a unitdata indication message to the SSCF/SSCOP component of originating media gateway 100. In line 11 of the message flow diagram, the SSCF/SSCOP component sends an AAL message_for_received message to the MTP3B component. In line 12 of the message flow diagram, the MTP3B component sends an MTP transfer indication message to the ALCAP component. In line 13 of the message flow diagram the ALCAP component sends an establish indication message to CRM 700 of originating media gateway 100. In line 14 of the message flow diagram, CRM 700 sends an SCCP connection request message to VSC 200. In line 15 of the message flow diagram, VSC 200 sends an SCCP connection response message to CRM component 700.

In line 16 of the message flow diagram, CRM component 700 of originating media gateway 100 sends an establish confirm message to the ALCAP component of originating media gateway 100. In line 17 of the message flow diagram, the ALCAP component sends an MTP transfer request message to the MTP3B component. In line 18 of the message flow diagram, the MTP3B component sends an AAL message_for_transmission message to the SSCF/SSCOP component. In line 19 of the message flow diagram, the SSCF/SSCOP component sends a unitdata request message to ATM manager 702. In line 20 of the message flow diagram, ATM manager 702 of originating media gateway 100 sends an MTP data message to ATM manager 702 of terminating media gateway 101 confirming establishment of the bearer channel.

In line 21 of the message flow diagram, ATM manager 702 of terminating media gateway 101 sends a unitdata indication message to the SSCF/SSCOP component of terminating media gateway 101. In line 22 of the message flow diagram, the SSCF/SSCOP component sends an AAL message_for_received message to the MTP3B component. In line 23 of the message flow diagram, the MTP3B component sends an MTP transfer indication message to the ALCAP component. In line 24 of the message flow diagram, the ALCAP component sends an establish confirm component to CRM 700 of terminating media gateway 101. In line 24 of the message flow diagram, CRM 700 of terminating media gateway 101 sends an SCCP connection request message to VSC 200. In line 26 of the message flow diagram, VSC 200 sends an SCCP connection response message to CRM 700. In line 27 of the message flow diagram, CRM 700 of terminating media gateway 101 sends an add reply message giving the binding identifier an address of the bearer channel to MGC 103. In line 28 of the message flow diagram, VSC 200 of originating media gateway 100 sends an NbUP initialization message to VSC 200 of terminating media gateway 101. In line 29 of the message flow diagram, VSC 200 sends an Nb-UP status message to CRM 706. In line 30 of the message flow diagram, CRM 706 sends a notify message to terminating MSC 103. In line 31 of the message flow diagram, VSC 200 sends an NbUP initialization acknowledgement message to VSC 200 of originating media gateway 100. In line 32 of the message flow diagram, VSC 200 of originating media gateway 100 sends an Nb-UP status message to CRM 700. In line 33 of the message flow diagram, CRM 700 sends a notify message to MGC 102.

In FIGS. 9A and 9B, all of the messages from line 5 through line 27 represent Q.2630 procedures for establishing a bearer channel on the Nb interface. According to the methods, systems, and computer program products described herein, such procedures are preferably only performed when a cached bearer channel is not available. Accordingly, media gateway resources for sessions involving wireless entities are conserved.

The procedure for releasing a bearer channel using Q.2630 procedures on the Nb interface is similar to that described above for the Iu interface. Hence, a description thereof will not provided herein. According to the methods, systems, and computer program products described herein, such release procedures are not required every time a session is released due to caching of the bearer channels.

Accordingly, the subject matter described herein includes methods, systems, and computer program products for caching and reusing bearer channels for sessions involving wireless entities. Such caching has not previously been performed on interfaces, such as the Nb and Iu interfaces for sessions involving wireless entities. Performing such procedures for sessions involving wireless entities greatly reduces the processing and signaling required to establish such sessions.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for caching and re-using bearer channels for voice over packet sessions involving wireless entities, the method comprising:
   (a) receiving a first setup request for establishing a voice over packet session involving a wireless entity, and, in response, establishing a bearer channel on an interface between a first node and a second node using bearer channel setup signaling;
   (b) detecting release of a first session, and, in response, caching the bearer channel for a predetermined time period;
   (c) receiving, a second setup request for a second voice over packet session involving the first and second nodes and a wireless entity; and
   (d) in response to receiving the second setup request within the time period, re-using the cached bearer channel for the second session.

2. The method of claim 1 wherein establishing a bearer channel includes establishing a bearer channel on an Nb interface between a first media gateway and a second media gateway.

3. The method of claim 1 wherein establishing a bearer channel includes establishing a bearer channel on an Iu interface between a radio network controller and a media gateway.

4. A method for caching and re-using bearer channels for voice over packet sessions involving wireless entities, the method comprising:
   (a) receiving a first setup request for establishing a voice over packet session involving a wireless entity, and, in response, establishing a bearer channel on an interface between a first node and a second node using bearer channel setup signaling, wherein establishing a bearer channel using bearer channel setup signaling includes establishing the bearer channel using Q.2630 signaling;
   (b) detecting release of a first session, and, in response, caching the bearer channel for a predetermined time period;
   (c) receiving, a second setup request for a second voice over packet session involving the first and second nodes and a wireless entity; and
   (d) in response to receiving the second setup request within the time period, re-using the cached bearer channel for the second session.

5. A method for caching and re-using bearer channels for voice over packet sessions involving wireless entities, the method comprising:
   (a) receiving a first setup request for establishing a voice over packet session involving a wireless entity, and, in response, establishing a bearer channel on an interface between a first node and a second node using bearer channel setup signaling;
   (b) detecting release of a first session, and, in response, caching the bearer channel for a predetermined time period;
   (c) receiving, a second setup request for a second voice over packet session involving the first and second nodes and a wireless entity; and
   (d) in response to receiving the second setup request within the time period, re-using the cached bearer channel for the second session, wherein re-using the previously established bearer channel includes assigning the second session to the bearer channel without using Q.2630 signaling for the second session.

6. A method for caching and re-using bearer channels for voice over packet sessions involving wireless entities, the method comprising:
   (a) receiving a first setup request for establishing a voice over packet session involving a wireless entity, and, in response, establishing a bearer channel on an interface between a first node and a second node using bearer channel setup signaling;
   (b) detecting release of a first session, and, in response, caching the bearer channel for a predetermined time period;
   (c) receiving, a second setup request for a second voice over packet session involving the first and second nodes and a wireless entity;
   (d) in response to receiving the second setup request within the time period, re-using the cached bearer channel for the second session; and
   (e) responsive to expiration of the time period, releasing the bearer channel.

7. A method for caching and re-using the bearer channels for voice over packet sessions involving wireless entities, the method comprising:
   (a) maintaining a cache of previously-established bearer channels for which sessions have been released;
   (b) receiving a setup request for a new voice over packet session involving a wireless entity;
   (c) determining whether the new session involves endpoints corresponding to any of the previously-established bearer channels; and
   (d) in response to determining that the new session uses endpoints corresponding to any one of the previously established bearer channels, assigning the session to the matching bearer channel.

8. The method of claim 7 wherein maintaining a cache of previously established bearer channels includes maintaining a cache of bearer channels on an Nb interface between media gateways.

9. The method of claim 7 wherein maintaining a cache of previously-established bearer channels includes maintaining a cache of bearer channels on an Iu interface between radio network controller.

10. A method for caching and re-using the bearer channels for voice over packet sessions involving wireless entities, the method comprising:

(a) maintaining a cache of previously-established bearer channels for which sessions have been released;

(b) receiving a setup re guest for a new voice over packet session involving a wireless entity;

(c) determining whether the new session involves endpoints corresponding to any of the previously-established bearer channels; and (d) in response to determining that the new session uses endpoints corresponding to any one of the previously established bearer channels, assigning the session to the matching bearer channel, wherein assigning the session to the matching bearer channel includes assigning the session to the bearer channel without using Q.2630 signaling.

11. A system for caching and re-using bearer channels for voice over packet sessions involving wireless entities, the system comprising:

(a) a protocol handler for receiving a setup request for voice over packet a first session involving a wireless entity, and, in response, for establishing a bearer channel between an interface of a first node and an interface of a second node using bearer channel setup signaling; and (b) a connection resource manager for detecting release of the first session, and, in response to the release, for caching the bearer channel for a predetermined time period, wherein the protocol handler is adapted to receive a second setup request for a second voice over packet session involving the first and second nodes and a wireless entity, and, in response, the resource manager is adapted to re-use the previously established bearer channel for the second session.

12. The system of claim 11 wherein the protocol handler is adapted to establish a bearer channel on an Nb interface between a first media gateway and a second media gateway.

13. The system of claim 11 wherein the protocol handler is adapted to establish a bearer channel on an lu interface between a radio network controller and a media gateway.

14. A system for caching and re-using bearer channels for voice over packet sessions involving wireless entities, the system comprising:

(a) a protocol handler for receiving a setup request for voice over packet a first session involving a wireless entity, and, in response, for establishing a bearer channel between an interface of a first node and an interface of a second node using bearer channel setup signaling, wherein the protocol handler is adapted to establish a bearer channel using Q.2630 signaling; and (b) a connection resource manager for detecting release of the first session, and, in response to the release, for caching the bearer channel for a predetermined time period, wherein the protocol handler is adapted to receive a second setup request for a second voice over packet session involving the first and second nodes and a wireless entity, and, in response, the resource manager is adapted to re-use the previously-established bearer channel for the second session.

15. A system for caching and re-using bearer channels for voice over packet sessions involving wireless entities, the system comprising:

(a) a protocol handler for. receiving a setup request for voice over packet a first session involving a wireless entity, and, in response, for establishing a bearer channel between an interface of a first node and an interface of a second node using bearer channel setup signaling; and (b) a connection resource manager for detecting release of the first session, and, in response to the release, for caching the bearer channel for a predetermined time period, wherein the protocol handler is adapted to receive a second setup request for a second voice over packet session involving the first and second nodes and a wireless entity, and, in response, the resource manager is adapted to re-use the previously established bearer channel for the second session, wherein the resource manager is adapted to assign the second session to the bearer channel without using Q.2630 signaling for the second session.

16. A system for caching and re-using bearer channels for voice over packet sessions involving wireless entities, the system comprising:

(a) a protocol handler for receiving a setup request for voice over packet a first session involving a wireless entity, and, in response, for establishing a bearer channel between an interface of a first node and an interface of a second node using bearer channel setup signaling; and (b) a connection resource manager for detecting release of the first session, and, in response to the release, for caching the bearer channel for a predetermined time period, wherein the protocol handler is adapted to receive a second setup request for a second voice over packet session involving the first and second nodes and a wireless entity, and, in response, the resource manager is adapted to re-use the previously- established bearer channel for the second session, wherein the resource manager is adapted to release the bearer channel responsive to expiration of the time period.

17. A system for caching and re-using bearer channels for voice over packet sessions involving wireless entities, the system comprising:

(a) a connection resource manager for maintaining a cache of previously-established bearer channels involving wireless entities for which voice over packet sessions have been released; and (b) a protocol handler for receiving a setup request for a new voice over packet session and for communicating with the connection resource manager as to whether a previously-established bearer channel can be used for the new session, wherein the connection resource manager is adapted to determine whether the new session utilizes endpoints corresponding to one of the previously-established bearer channels, and, in response to determining that the new session uses endpoints corresponding to one of the previously-established bearer channels, the connection resource manager is adapted to assign the new session to the matching bearer channel.

18. The system of claim 17 wherein the connection resource manager is adapted to maintain a cache of bearer channels on an Nb interface between media gateways.

19. The system of claim 17 wherein the connection resource manager is adapted to maintain a cache of bearer channels on an lu between a media gateway and a radio network controller.

20. A system for caching and re-using bearer channels for voice over packet sessions involving wireless entities, the system comprising:

(a) a connection resource manager for maintaining a cache of previously- established bearer channels involving wireless entities for which voice over packet sessions have been released; and (b) a protocol handler for receiving a setup request for a new voice over packet session and for communicating with the connection resource manager as to whether a previously-established bearer channel can be used for the new session, wherein the connection resource manager is adapted to determine whether the new session utilizes endpoints corresponding to one of the previously-established bearer channels, and, in response to determining that the new session uses endpoints corresponding to one of the previously-established bearer channels, the connection resource manager is adapted to assign the new session to the matching bearer channel by assigning the bearer channel to the new session without using Q.2630 signaling.

21. A computer readable medium having stored thereon computer executable instructions that when executed by the processor of a computer perform steps comprising:

(a) receiving a first setup request for establishing a voice over packet session involving a wireless entity, and, in response, establishing a bearer channel on an interface between a first node and a second node using bearer channel setup signaling;

(b) detecting release of a first session, and, in response, caching the bearer channel for a predetermined time period;

(c) receiving, a second setup request for a second voice over packet session involving the first and second nodes and a wireless entity; and (d) in response to receiving the second setup request within the time period, re-using the cached bearer channel for the second session.

* * * * *